March 10, 1931. G. WÜNSCH 1,795,694
STEERING MECHANISM FOR AIRCRAFT
Filed Oct. 31, 1929
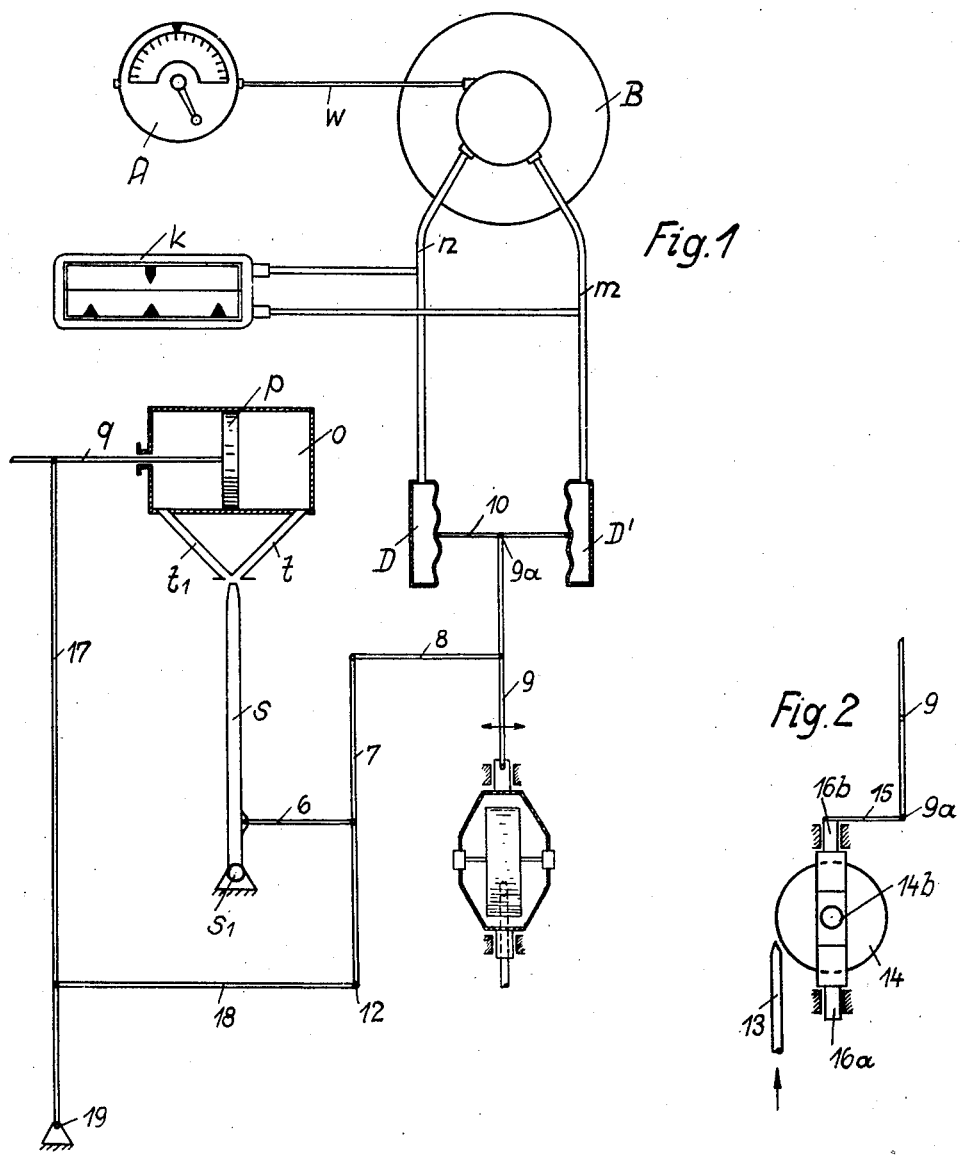
Inventor:
Guido Wünsch
by _____
attorney Patented Mar. 10, 1931

1,795,694

UNITED STATES PATENT OFFICE

GUIDO WÜNSCH, OF BERLIN-STEGLITZ, GERMANY

STEERING MECHANISM FOR AIRCRAFT

Application filed October 31, 1929, Serial No. 403,883, and in Germany November 20, 1928.

This invention relates to steering mechanism for aircraft and consists essentially in further improvements of a construction of this kind which I have disclosed and claimed in my United States Letters Patent, No. 1,729,850. According to my present invention the steering mechanism is provided with novel auxiliaries by means of which the relative motion between the compass casing and the magnet system thereof is utilized to effect lateral steering of the aircraft by means of a pressure medium.

My present invention consists in a further improvement of the aforementioned steering mechanism which improvement consists essentially in an apparatus which is responsive to turning motions of the aircraft, such as a gyroscopic device or the like which serves for adjusting the magnitude of two impulses effecting the lateral steering. This apparatus, more especially, is properly adjusted to permit only travel of the aircraft along a path of travel having a definite minimum curvature.

My present invention comprises additional improvements for the steering mechanism which improvements will be more fully described herein as the specification proceeds and finally pointed out in the appended claims.

My aforementioned U. S. Letters Patent No. 1,729,850 has essentially for its object to provide a steering mechanism for aircraft, such as aeroplanes and the like, said mechanism enabling the passenger to determine the direction of travel by rotating a compass casing with respect to the magnet system thereof so as to control a source of power which supplies the forces for operating the steering device. According to my aforementioned patent this source of power is provided by the pressure of one or more jets or streams of a fluid, preferably air, which jets or streams are controlled by the rotation imparted by the passenger to the compass casing relatively to the magnet system thereof.

A prominent object of my present invention consists in utilizing the steering mechanism described in my aforementioned patent in order to effect automatic steering of aircraft, such as an aeroplane or the like, in a lateral direction. For this purpose the pressure of the fluid generated by the motion of the compass casing is used for adjusting a pressure nozzle which acts upon a control cylinder in the well known manner, said control cylinder actuating the vertical rudder which serves for steering in a lateral direction.

In the accompanying drawing Fig. 1 is a diagrammatic view showing the general arrangement of the novel steering mechanism forming part of my present invention and Fig. 2 a diagrammatic partial side view taken on Fig. 1.

Referring now more particularly to the drawing, the device which may be adjusted by the passenger consists of a direction indicator as indicated at A. By properly adjusting the device A the compass casing B is rotated in the manner described in my aforementioned U. S. patent. Accordingly, the shaft which connects the adjusting device A with the compass casing B is indicated at W in Fig. 1. By adjusting the compass casing B a throttling pressure is generated and transmitted to the devices which serve to effect the lateral steering by means of pipe conduits $m$ and $n$. At first the pressure will be transmitted to a direction indicator K and thereupon conveyed into two pressure chambers D and $D^1$ which are closed by diaphragms at their oppositely positioned sides. Connected to these diaphragms is a nozzle $s$ mounted rotatably around a shaft $s^1$ which nozzle is continuously supplied with air under pressure. Opposite to the nozzle $s$ there are provided two conduits $t$ and $t^1$ leading to the two ends respectively of the control cylinder $o$, as indicated in Fig. 1. The control cylinder $o$ is equipped with a piston $p$ which operates the lateral rudder of the aircraft, such as an aeroplane or the like, in any desired known manner.

Transmission of motion from the diaphragms D and $D^1$ to the nozzle $s$ is effected by means of a connecting rod 10 which is provided intermediate said two diaphragms, said connecting rod being pivotally connected to one end of a lever 9. The lever 9 is mounted to rock around the point 11 in case motion is imparted to said lever by means of said diaphragms. Motion of the lever 9 is transmitted by means of a further connecting rod 8 to a lever 7 mounted to rock around the point 12, the motion of said latter lever being transmitted to the nozzle *s* by means of the connecting rod 6.

In certain cases the device so far described herein may involve a certain inconvenience, inasmuch as violent oscillating motions are produced, said motions being due to the fact that upon each adjustment of the compass casing the magnet system will at first lag somewhat behind said adjustment and, even in case a proper damping device is employed, will not come to rest before several oscillating motions. In consequence of this an oversteering would be the result, said over-steering being further augmented by the inertia of the aircraft. Also, in case of straight forward travel of the aircraft the continuous oscillatory motions of the magnet system would cause disturbing pendulating motions and by reason of this a travel of the aircraft in zig-zag direction.

In order to avoid this drawback, the hereinabove described steering mechanism may further be improved in such a way that the source of power which is caused to come into action by the magnet system of the compass and serves to furnish the force necessary for steering is counter-acted by a further source of power which likewise acts upon the device for lateral steering, such as the vertical rudder. An additional source of power of this kind may for instance be caused to come into action by means of an indicator handle or the like. The steering mechanism may further be provided with a back guiding means for the vertical rudder, said back guiding means having a tendency to move said rudder back into its zero position, in order to exert a further stabilizing effect upon the steering mechanism. For the aforeindicated purpose the center of rotation 11 of the lever 9 is mounted to permit motion of its own; more particularly, the center of rotation 9*a*, as may be seen from Fig. 2, is connected by means of a connecting rod 15 with the frame of a gyroscopic device 14. The gyroscope is mounted in the bearings 14*a* and 14*b* in the frame and driven by means of compressed air supplied through the pipe 13.

In case of a turning motion of the aeroplane, the gyroscope, due to an oblique position thereof, by reason of the precession will gyrate together with its frame around the two pivots 16*a* and 16*b*. In consequence thereof the connecting rod 15 associated with the pivot 16*b* will also cause a displacement of the center of rotation 11 of the lever 9. When so displacing the center of rotation of the lever 9 the point 9*a* of this lever—which is the point of action on the connecting rod 10—will constitute the center of the swinging motion. According to the sense of the turning motion of the aircraft either the bearing 14*a* or the bearing 14*b* will now be raised, thereby moving the lever 9 towards the one or the other direction. The gyroscope 14 now will act upon the nozzle S in a direction opposite to that in which said nozzle is acted upon by the diaphragms D and $D^1$. By properly adjusting the lengths of the several arms of the levers the device may be caused to operate in such a way that the steering force which is initiated by the compass-casing B, although overpowering the counter-pressure of the gyroscope by reason of its continuity of action, will actually have the effect of steering the aircraft into a new desired direction of travel, the counter-force by reason of its backward steering action, however, permitting travel of the aircraft only along a path of minimum curvature, thus positively preventing any over-steering, at the same time permitting a gradual transition of the aircraft into the new direction of travel. In case of sudden incidental oscillations of the magnet system or other exterior actions, however, the turning power which is initiated by the gyroscope will keep the aircraft in its proper direction of travel.

The center of rotation 12 of the lever 7 may now be further connected with a lever 17 by means of a connecting rod 18, said lever 17 being mounted to rock around a fixed axle 19. The free end of the lever 17 is pivotally connected to the piston-rod *q* and if now by reason of a deflection of the nozzle *s* the piston *p* is moved to adjust the device for lateral steering, such as the vertical rudder, the just described connection will effect motion of the center of rotation 12 in one or the other direction in such a manner that now the nozzle *s* is again moved in a backward direction. If, for instance, the lever 7 has been swung around its center of rotation 12 towards the right, compressed air will be supplied to the right-hand end of the cylinder *o*, the piston *p* now will move towards the left and consequently also the center of rotation 12 of the lever 7 will be swung towards the left by action of the rods 17 and 18 so that said center of rotation 12 will effect backward motion, towards the left, of the nozzle *s* into its central position. By this there will be exerted a further stabilizing effect upon the steering mechanism so that the gyroscope likewise will not bring about any over-steering, in case the aircraft has eventually been thrown out of its direction of travel, for instance, by a heavy gale.

It may finally be mentioned that besides the hereinabove described automatic steering mechanism also an additional manually actuated steering mechanism may be provided. This may, for instance, be done in that the vertical rudder as well as the further auxiliaries for lateral steering, such as balancing planes, are equipped in the usual manner with actuating rods and is provided a device on the lat er for releasing the source of power which serves for automatic steering as soon as said actuating rods are manually operated, for instance, by swinging out the pressure-fluid nozzle *s* when actuating the manual steering device so that said nozzle is put out of operation or the supply of compressed air or the like is cut off.

My present invention may be carried out in details in various ways different from those described herein and shown in the accompanying drawing. Thus, for instance, the control cylinder *o* and piston *p* may also be replaced by diaphragms mounted in proper casings and instead of the movable pressure fluid nozzle *s* also two or more pressure conduits may be used which are throttled by means of a gyroscope and backguiding means.

I claim:

1. A steering mechanism for aircraft, comprising in combination a compass having a casing and a magnet system, a source of power for imparting an impulse to said steering mechanism, a fluid pressure device arranged to be actuated by and in dependence upon relative motion between said compass casing and said magnet system, means controlling the steering of the aircraft in dependence upon the fluid pressure device, a further source of power arranged to counteract the steering impulse exerted by the first-named source of power, controlled by the compass, and a gyroscopic device responsive to rotational movement of the aircraft, the values of said two steering impulses being properly adjusted to permit travel of the aircraft only along paths of a definite minimum curvature.

2. A steering mechanism for aircraft, comprising in combination a compass having a casing and a magnet system, a source of power for imparting an impulse to said steering mechanism, a fluid pressure device arranged to be actuated by and in dependence upon relative motion between said compass casing and said magnet system, means controlling the steering of the aircraft in dependence upon the fluid pressure device, a further source of power arranged to counteract the steering impulse exerted by the first-named source of power, controlled by the compass, and a gyroscopic device responsive to rotational movement of the aircraft, and a double-armed lever arranged to be actuated by the fluid pressure device and the precession of the said gyroscopic device, said fluid pressure device being connected to the fulcrum of the said double-armed lever to produce proper steering pressure in connection with said fluid pressure device.

3. A steering mechanism for aircraft, comprising in combination a compass having a casing and a magnet system, a source of power for imparting an impulse to said steering mechanism, a fluid pressure device arranged to be actuated by and in dependence upon relative motion between said compass casing and said magnet system, means controlling the steering of the aircraft in dependence upon the fluid pressure device, and adjusting device for the lateral steering means, namely the vertical rudder, and an additional device operatively connected with said adjusting device, said additional device tending to move the lateral steering means back into inactive position.

4. A steering mechanism for aircraft, comprising in combination a compass having a casing and a magnet system, a source of power for imparting an impulse to said steering mechanism, a fluid pressure device arranged to be actuated by and in dependence upon relative motion between said compass casing and said magnet system, means controlling the steering of the aircraft in dependence upon the fluid pressure device, and actuating mechanism for lateral steering, said mechanism consisting of two levers, one of which is arranged behind the other and having a movable pivot to permit one said lever to be actuated at both its ends by an impulse exerted by the compass and its magnet system, means connecting a suitable point of said lever with one end of the other lever, the other end of the latter lever being operatively connected with the lateral steering means of the aircraft, thus permitting the steering of the latter by an oscillating motion of said fluid pressure device from a suitable point of said last-named lever.

5. In an automatic mechanism for steering a course for aircraft, the combination which includes a compass, consisting of a housing and a system of magnets, a steering servo motor for actuating the lateral rudder, a source of power which furnishes the power for actuating the said rudder servo motor, a relay which controls the said source of power, a compressed air drive means which is actuated in dependence upon the relative motion between the said compass housing and the said magnet system, a power connection between the said compressed air drive means and the said relay such that the rudder servo motor is actuated by relative rotation of the said magnet system with respect to the said compass housing, an element for indicating rotation of the aircraft about its vertical axis, a power connection between the said indicating element and the said relay such that upon deflections of the said indicating element the said relay connects the said rudder servo motor for reverse steering, the said power connections between the said compressed air drive means and the said relay and the power connection between the said element for indicating the rotation of the aircraft about its vertical axis and the said relay being so proportioned to each other that only curves of a definite minimum curvature can be followed.

In testimony whereof I affix my signature.

GUIDO WÜNSCH.